Feb. 22, 1949.   F. N. BARD   2,462,592
FLEXIBLE JOINT
Filed Oct. 5, 1944
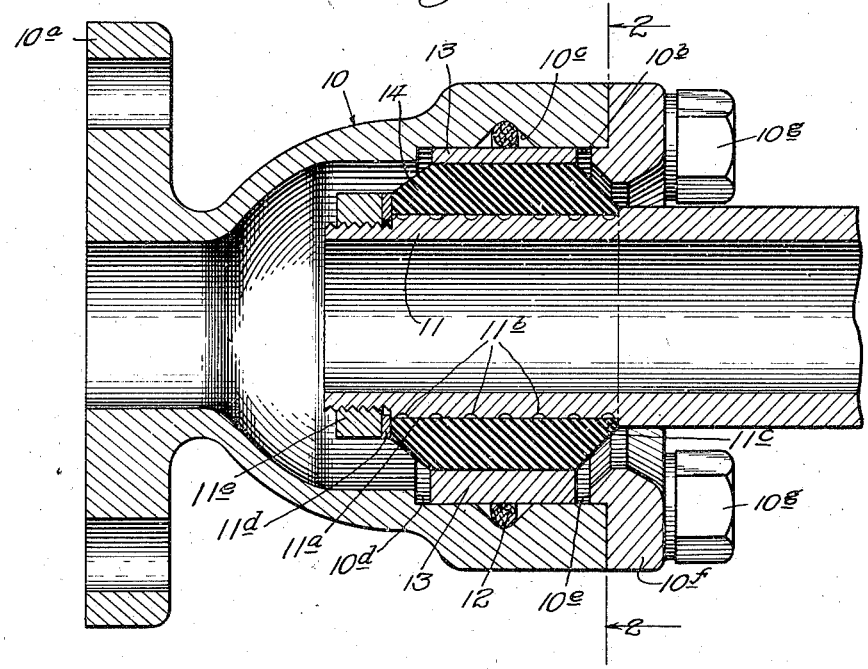
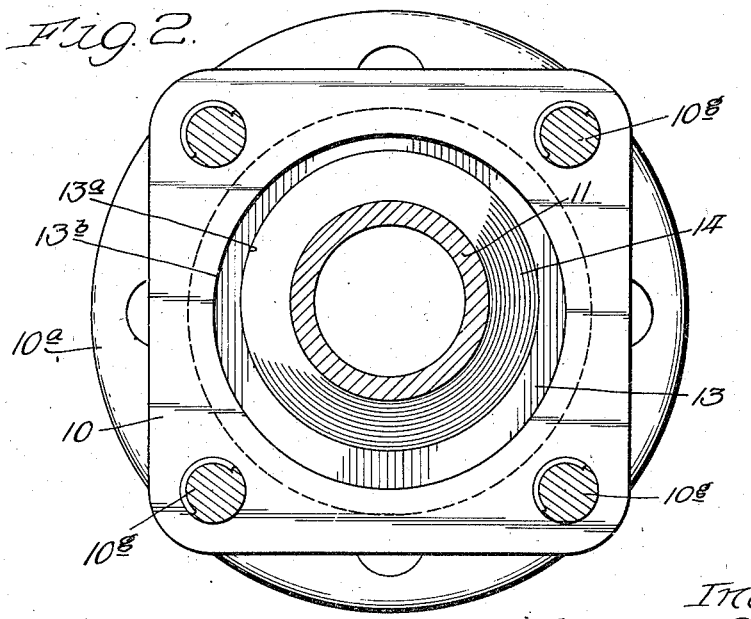
Inventor:
Francis N. Bard,
By Chritton, Wiles, Schroeder,
Merriam & Holgren, Attys.

Patented Feb. 22, 1949

2,462,592

UNITED STATES PATENT OFFICE 2,462,592

FLEXIBLE JOINT

Francis N. Bard, Highland Park, Ill.

Application October 5, 1944, Serial No. 557,244

5 Claims. (Cl. 285—90)

This invention relates to a flexible joint, and more particularly to a joint incorporating resilient means such as rubber.

One feature of this invention is that it provides an improved flexible joint; another feature of this invention is that it provides a joint structure having a number of advantages and functions; yet another feature of this invention is that it makes use of resilient means such as rubber to provide at least limited angular movement; still another feature of this invention is that the joint incorporates means providing sliding movement to compensate for expansion; a further feature of this invention is that this joint prevents transmission of vibrations from one pipe section to another; and yet a further feature of this joint is that it incorporates means for compensating for improper alignment of the axes of the pipes it connects. Other features and advantages of this invention will be apparent from the following specification and the drawings, in which: Figure 1 is a longitudinal sectional view of a joint embodying my invention; and Figure 2 is a transverse sectional view along the line 2—2 of Figure 1.

There are, of course, innumerable situations where it is desirable to use a flexible joint to couple one length of pipe to another or to some device to which it is to be connected. I have devised and am here disclosing and claiming a joint which permits at least limited angular movement, which permits sufficient sliding movement to compensate for expansion and contraction, which can be readily adjusted to compensate for misalignment of a pipe or pipes, and which absorbs and prevents transmission of vibrations from one section to the other.

In the particular embodiment of my invention illustrated in the drawings, the joint comprises as its two principal elements an outer joint member or housing member 10 and an inner joint member 11 here shown as part of a pipe section, although it will be understood that this may also be a separate member connected in any conventional manner to the remainder of the length of pipe. The outer joint member is here shown as provided with a flange portion 10a adapted to be bolted to the device to which the pipe is to be connected by the joint, although it will be understood that any conventional connecting arrangement may be used.

The inner surface of the outer joint member 10 is provided with a cylindrical surface here identified as 10b, this surface confronting and being spaced from the outer cylindrical surface 11a of the inner joint member 11. In the center of the cylindrical surface 10b is a V-shaped annular groove 10c adapted to receive a gasket ring 12 sometimes known to the trade as an O-ring. The inner end of the cylindrical surface 10b is defined by a shoulder here identified as 10d; and the outer end is defined by a shoulder 10e provided by a ring 10f held in place in any convenient manner, as by studs 10g.

Within the outer joint member and slidably movable on the cylindrical surface 10b is an annular eccentric member 13. The outer radius of this member is preferably such as to make it a close, although sliding, fit on the cylindrical surface 10b; and the gasket ring 12 makes this sliding relationship liquid-sealed. The width of the annular member is preferably substantially less than the length of the cylindrical surface as defined between the shoulders 10d and 10e, so that the annular member may slide longitudinally of the joint through a sufficient distance (as a quarter of an inch or more) to compensate for expansion and contraction in the pipe.

The annular eccentric member 13 is also provided with an inner cylindrical surface, this inner surface 13a being eccentric with respect to the center of the outer cylindrical surface 13b, as may be best seen in Figure 2. The annular member 13 is connected to the inner joint member 11 by resilient means 14, as an annular member of rubber. The central body portion of this member 14 is preferably of uniform thickness, so that the inner joint member 11 is concentric with respect to the inner surface 13a of the eccentric member. Rotation of the eccentric member and inner joint member thus results in shifting the axis of the inner joint member with respect to the axis of the outer joint member. This is of considerable advantage in many applications, as it enables sufficient adjusting movement to compensate for misalignment of the pipe section with respect to the axis of the opening or other pipe section to which it is to be connected. If desired, the inner cylindrical surface 10b can be slightly eccentric with respect to the axis of the outer joint member 10.

As may be best seen in Figure 1, the outer surface 11a of the inner joint member 11 is provided with a plurality of annular grooves 11b, providing a better grip for the annular rubber member 14; and this member is further held in place by the provision of a shoulder 11c at one end of the surface 11a, and a removable shoulder at the other end, this latter being provided by a washer 11d held in place by a nut 11e threaded on the end of the pipe member. The rubber member 14 is first expanded and then contracted around the inner joint member 11 with considerable tension, a vulcanizing compound being used between the pipe and rubber to bond the two together. The rubber is then placed under considerable compression and forced into the eccentric member 13, against which it expands with considerable force, a vulcanizing compound again being used to bond the two together. The use of the rubber not only enables angular movement without the wear encountered in conventional ball joints, but also provides very effective vibration isolating means between the two sections of the joint.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A joint of the character described, including: an outer joint member; an inner joint member, said members having spaced confronting surfaces, at least one of the confronting surfaces being cylindrical; an annular eccentric member rotatable on said cylindrical surface; and resilient means between said annular member and the other of the confronting surfaces permitting angular movement between said joint members.

2. A joint of the character described, including: an outer joint member; an inner joint member, said members having spaced confronting surfaces, at least one of the confronting surfaces being cylindrical and eccentric; an annular eccentric member rotatable and longitudinally slidable on said cylindrical surface and liquid-sealed with respect thereto; and resilient means between said annular member and the other of the confronting surfaces permitting angular movement between said joint members.

3. A joint of the character described, including: an outer joint member; an inner joint member, said members having spaced confronting surfaces, at least one of the confronting surfaces being cylindrical; an annular eccentric member rotatable on said cylindrical surface; and resilient means between said annular member and the other of the confronting surfaces permitting angular movement between said joint members, with said resilient means being bonded to said annular member and said other of the confronting surfaces.

4. A joint of the character described, including: an outer joint member; an inner joint member, said members having spaced confronting surfaces, at least one of the confronting surfaces being cylindrical; an annular member rotatable on said cylindrical surface and movable longitudinally on said surface; and resilient means between said annular member and the other of the confronting surfaces permitting angular movement between said joint members, with said resilient means being bonded to said annular member and said other of the confronting surfaces.

5. A joint of the character described, including: an outer joint member; an inner joint member, said members having spaced confronting surfaces, at least one of the confronting surfaces being cylindrical; an annular member rotatable on said cylindrical surface and movable longitudinally on said surface; resilient means between said annular member and the other of the confronting surfaces permitting angular movement between said joint member, with said resilient means being bonded to said annular member and said other of the confronting surfaces; and sealing means between said annular member and said cylindrical surface.

FRANCIS N. BARD.

REFERENCES CITED

The following references are of record in the file of this patent:

UNITED STATES PATENTS

| Number | Name | Date |
| --- | --- | --- |
| 341,444 | Bray | May 11, 1886 |
| 958,752 | Mackensen | May 24, 1910 |
| 1,357,219 | Brewster | Nov. 2, 1920 |
| 1,793,888 | Whitehouse | Feb. 24, 1931 |
| 2,145,189 | Nathan | Jan. 24, 1939 |
| 2,344,693 | Howe | Mar. 21, 1944 |

FOREIGN PATENTS

| Number | Country | Date |
| --- | --- | --- |
| 174,092 | Germany | Sept. 20, 1906 |